US009805290B2

(12) United States Patent
Choromanski et al.

(10) Patent No.: US 9,805,290 B2
(45) Date of Patent: Oct. 31, 2017

(54) SKELETON DATA POINT CLUSTERING

(71) Applicant: GOOGLE INC., Mountain View, CA (US)

(72) Inventors: Krzysztof Marcin Choromanski, New York, NY (US); Sanjiv Kumar, White Plains, NY (US)

(73) Assignee: Google Inc., Mountain View, CA (US)

( * ) Notice: Subject to any disclaimer, the term of this patent is extended or adjusted under 35 U.S.C. 154(b) by 385 days.

(21) Appl. No.: 14/512,893

(22) Filed: Oct. 13, 2014

(65) Prior Publication Data

US 2016/0103842 A1 Apr. 14, 2016

(51) Int. Cl.
*G06K 9/62* (2006.01)

(52) U.S. Cl.
CPC .......... *G06K 9/6255* (2013.01); *G06K 9/622* (2013.01)

(58) Field of Classification Search
CPC .......... G06F 17/3071; G06F 17/30601; G06F 17/30598; G06F 17/30705; G06F 17/30713
See application file for complete search history.

(56) References Cited

U.S. PATENT DOCUMENTS

| 2010/0191731 A1* | 7/2010 | Rus | G06Q 10/10 |
| | | | 707/737 |
| 2011/0055140 A1* | 3/2011 | Roychowdhury | G06K 9/6223 |
| | | | 706/54 |
| 2013/0235066 A1* | 9/2013 | Souza | G06F 17/30247 |
| | | | 345/593 |
| 2014/0169673 A1* | 6/2014 | Liu | G06F 17/30247 |
| | | | 382/170 |
| 2014/0258295 A1* | 9/2014 | Wang | G06F 17/30256 |
| | | | 707/737 |

OTHER PUBLICATIONS

Ailon et al., "Streaming k-means approximation," Neural Processing Systems Conference, pp. 10-18, 2009.
Guha et al., "Clustering data streams: Theory and practice," IEEE Transactions on Knowledge and Data Engineering, 15:515-528, May 2003.
Shindler et al., "Fast and accurate k-means for large datasets," Advances in Neural Information Processing Systems 24: 25th Annual Conference on Neural Information Processing Systems Conference, pp. 2375-2383, 2011.

* cited by examiner

*Primary Examiner* — Ashish K Thomas
*Assistant Examiner* — Dustin Eyers
(74) *Attorney, Agent, or Firm* — Fish & Richardson P.C.

(57) ABSTRACT

Methods, systems, and apparatus, including computer programs encoded on computer storage media, for clustering data points. One of the methods includes maintaining data representing a respective ordered tuple of skeleton data points for each of a plurality of clusters. One or more intersecting clusters are determined for a new data point. An updated tuple of skeleton data points is generated for an updated cluster by selecting updated skeleton data points, including selecting the new data point or an existing jth skeleton data point of one of the one or more intersecting clusters according to which random value, of the jth random value for the new data point or the random value for the jth existing skeleton data point, is closest to a limiting value. The new data point is then assigned to the updated cluster.

9 Claims, 12 Drawing Sheets

SKELETON DATA POINT CLUSTERING

BACKGROUND

This specification relates to clustering.

Clustering generally involves techniques for assigning data points to clusters. Data points assigned to a cluster may be referred to as cluster members. Clustering techniques aim to assign data points to clusters so that data points within a cluster have a common attribute or more similarity with each other than data points assigned to other clusters. Each data point may be assigned to one or more clusters.

A data point can be any appropriate collection of data having one or more features. For example, a data point can be a feature vector having elements whose values represent features of an observation, e.g., of an email message, a network request from a user, or a user selection of a link.

Online clustering involves assigning data points to clusters as the data points are received. Typically, online clustering processes are designed to assign data points to clusters by making only one pass over the data points. In other words, the data points are assigned to clusters while considering each data point only once.

Online clustering techniques are often used for streaming and real-time applications in which speed is critical and where the data points are frequently changing. For example, some email systems may handle upwards of 20,000 email messages per second. Thus, the email systems can use online clustering techniques to cluster arriving email messages in order to detect clusters of spam email messages. The clusters of spam email messages can then be quarantined, deleted, or marked as spam.

SUMMARY

This specification describes how a system can maintain skeleton data points to perform fast, online clustering. Each cluster is represented by a tuple of skeleton data points, which are selected members of the cluster. The system assigns new arriving data points to clusters according to which clusters have nearby skeleton data points.

In general, one innovative aspect of the subject matter described in this specification can be embodied in methods that include the actions of maintaining a respective collection of skeleton data points for each of one or more clusters, wherein each skeleton data point has a respective associated random value; receiving the new data point; determining one or more intersecting clusters for the new data point, each intersecting cluster being a cluster having at least a first number of skeleton data points being within a threshold distance of the new data point; generating, for the new data point, a number of random values, the number being equal to a number of skeleton data points in each collection of skeleton data points for each of the one or more intersecting clusters; selecting updated skeleton data points for an updated cluster, including selecting, for each updated skeleton data point of an updated collection of skeleton data points for the updated cluster, an existing skeleton data point in an intersecting cluster or the new data point according to which data point has a smallest associated random value; replacing the one or more intersecting clusters with the updated cluster, the updated cluster being represented by the updated collection of skeleton data points; and assigning the new data point to the updated cluster. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In general, another innovative aspect of the subject matter described in this specification can be embodied in methods that include the actions of maintaining data representing a respective ordered tuple of skeleton data points for each of a plurality of clusters, wherein each skeleton data point has a respective associated random value; receiving the new data point x and generating h random values for the new data point x; determining one or more intersecting clusters that each have at least a first number of skeleton data points being within a threshold distance of the new data point x; generating an updated tuple of skeleton data points for an updated cluster by selecting, for each j representing a position in each tuple of skeleton data points of the intersecting clusters, a jth updated skeleton data point, including selecting the new data point x or an existing jth skeleton data point of one of the one or more intersecting clusters according to which random value, of the jth random value for x or the random value for the jth existing skeleton data point, is closest to a limiting value; and assigning the new data point x to the updated cluster. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include replacing the one or more intersecting clusters with the updated cluster having the updated tuple of skeleton data points. The actions include receiving a new data point y; determining that none of the plurality of clusters have at least a threshold number of skeleton data points being within a threshold distance of the new data point y; generating h new random values for the new data point y; and generating a new cluster represented by a tuple of new skeleton points, each new skeleton point being y and being associated with a respective new random value for y; and adding the new cluster to the plurality of clusters. Selecting the new data point x or an existing jth skeleton data point of one of the one or more intersecting clusters according to which random value, of the jth random value for x or the random value for the jth existing skeleton data point, is closest to the limiting value comprises determining a minimum value among the jth random value for x and each random value for the one or more jth skeleton data points of the one or more intersecting clusters. Selecting the new data point x or an existing jth skeleton data point of one of the one or more intersecting clusters according to which random value, of the jth random value for x or the random value for the jth existing skeleton data point, is closest to the limiting value comprises determining a maximum value among the jth random value for x and each random value for the one or more jth skeleton data points of the one or more intersecting clusters. The actions include assigning, to the updated cluster, members of the one or more intersecting clusters that are not members of the updated cluster. Determining one or more intersecting clusters comprises determining the one or more intersecting clusters for the new data point x no more than once. Generating h random values for the new data point x comprises partitioning a feature space of data points into a plurality of cells; determining an identifier of a first cell of the plurality of cells to which the new data point x belongs; and using the identifier as a seed value for a random number generation process.

Particular embodiments of the subject matter described in this specification can be implemented so as to realize one or more of the following advantages. Maintaining skeleton data points for clusters allows a system to perform very fast online clustering in which each incoming data point is examined only once. Choosing the skeleton clusters using randomly generated values results in skeleton data points having a high probability of occurring in dense regions of the cluster. The generated clusters can have arbitrary shapes; in particular, they can have nonparametric and non-convex shapes. The shapes and number of the clusters need not be known in advance and can be discovered at runtime. The system can perform very high performance clustering without performing any cluster splitting operations. The system can automatically adapt to drifting or dynamically changing data distributions, which arise commonly in real-world applications, e.g., email messages.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
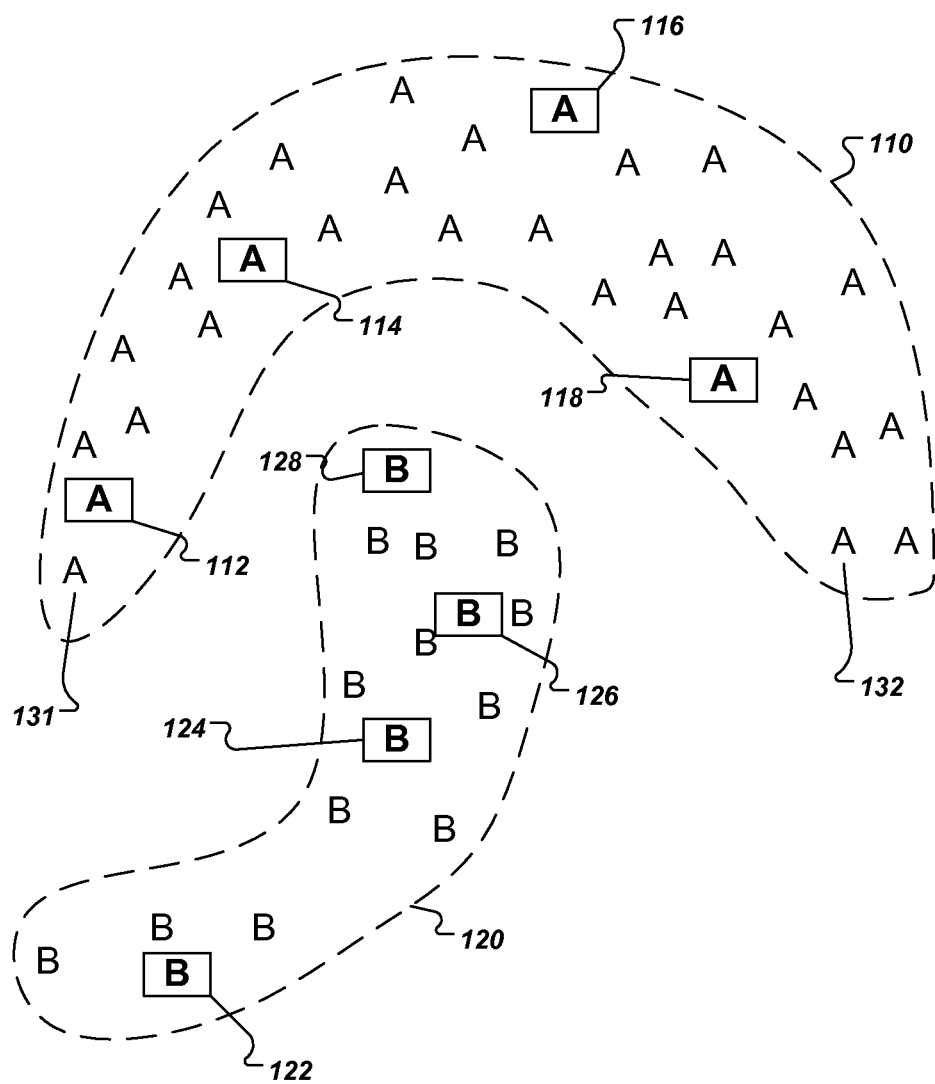
FIG. 1 is a diagram illustrating skeleton data points of two clusters.

FIG. 1 is a diagram illustrating skeleton data points of two clusters. The data points having the label "A" are assigned to a first cluster 110 and the data points having the label "B" are assigned to a second cluster 120. When a system receives a new data point, the system can assign the data point to one of the clusters. Each cluster has an associated identifier, and the system can assign the new data point to a particular cluster by associating the new data point with an identifier of the particular cluster.

For a new data point, the system can assign the data point to the first cluster 110, assign the data point to the second cluster 120, merge the first cluster 110 and the second cluster 120 to form a new cluster and assign the data point to the new cluster, or generate a new, third cluster and assign the data point to the third cluster as initial and sole data point in the third cluster.

A system can determine which action to take by maintaining data representing an ordered tuple of skeleton data points for each cluster. A skeleton data point for a cluster is a data point assigned to that cluster and which has been selected as one of h representative skeleton data points for the cluster. As illustrated in FIG. 1, the first cluster 110 has four skeleton data points 112, 114, 116, and 118, and the second cluster 120 also has four skeleton data points 122, 124, 126, and 128.

Typically, the number h is much smaller than the number of members in a cluster. For example, a cluster may have 10,000 members but only 200 skeleton data points. The size of h may depend on the dimensionality of the data or the expected complexity of the cluster shapes. Thus, h can be selected to be larger when the data is expected to be more complex. All clusters generated by the system may have the same number h of skeleton data points, or some of the clusters may have a different number of skeleton data points.

By using skeleton data points to assign data points to clusters, a system can generate clusters that have non-convex shapes. A cluster has a convex shape if for every pair of points in the cluster, a line segment that joins the pair of points lies completely within a boundary of the cluster. For example, both the first cluster 110 and the second cluster 120 have non-convex shapes because a line segment joining some pairs of points would lie at least partially outside the boundary of cluster or even within the boundary of a different cluster. For example, a line segment joining the data points 131 and 132 would lie outside the boundary of the first cluster 110 and would even lie partially within the second cluster 120.

Figure 2:
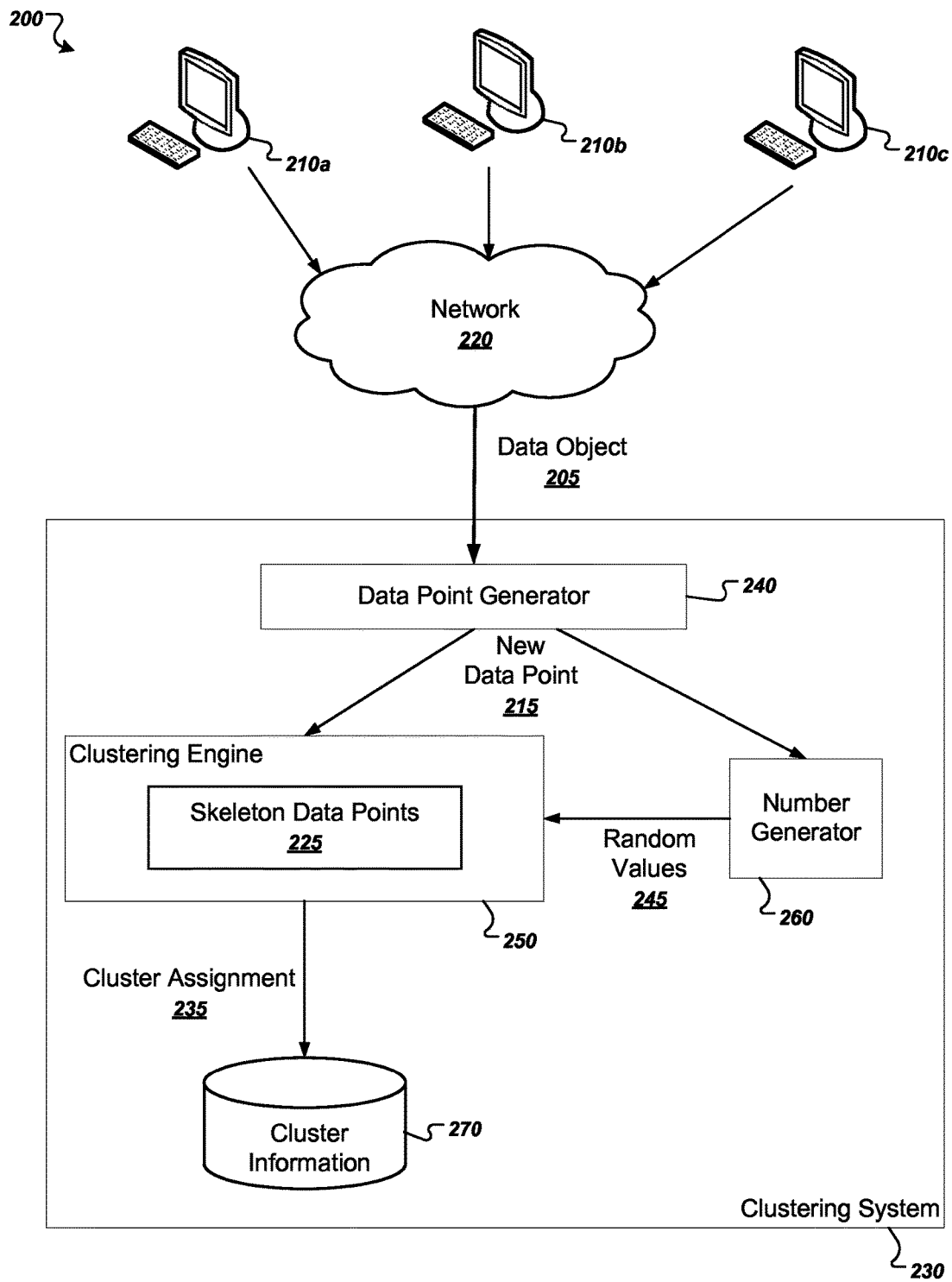
FIG. 2 illustrates an example system.

FIG. 2 illustrates an example system 200. The system 200 includes multiple user devices 210a, 210b, and 210c in communication with a clustering system 230 over a network 220. The clustering system 230 receives data objects 205 from the user devices 210a-c or from other sources, transforms the data objects 205 into data points, and assigns each new data point 215 to a particular cluster.

The clustering system 230 may be one part of an overall computing system, for example, an email system, in which case the data objects 205 may be email messages received from the user devices 210a-c. The clustering system 230 may also be part of a microblogging or social networking service, in which case the data objects 205 may be status updates or microblog messages. The clustering system 230 may also be part of a business reviewing service system that provides information about customer reviews of businesses, in which case the data objects 205 may be customer reviews.

The clustering system 230 includes a data point generator 240, a clustering engine 250, and a number generator 260. These components of the clustering system 230 can be implemented as computer programs installed on one or more computers in one or more locations that are coupled to each through a network.

The data point generator 240 receives data objects 205 and transforms each data object into a data point. In general, a data point is a representation of the data object that allows for faster comparison of the data object to other data objects. For example, the data point generator 240 can receive a data object that is an email message, compute multiple features of the email message, and generate a data point that is a feature vector representing the email message. The clustering system 230 can then compare the email message to other email messages by comparing corresponding feature vectors that represent the email messages.

The clustering engine 250 receives a new data point 215 and uses a collection of skeleton data points 225 to determine a cluster assignment 235 for the new data point. Because the number of skeleton data points 225 is relatively small, the clustering engine may maintain the skeleton data points in high-speed random access memory, e.g., dynamic random-access memory (DRAM).

The clustering engine 250 updates the skeleton data points 225 by using random values 245 generated by a random number generator 260, which may be any appropriate conventional random number generator. The number generator 260 can be a true random number generator or a pseudo-random number generator. In either case, the generated numbers will be referred to as "random" numbers. The random values 245 as a whole substantially exhibit properties of a particular probability distribution. For example, the random values 245 may substantially exhibit properties of an open-ended uniform distribution having values between 0 and 1. In other words, all values between 0 and 1 are substantially equally likely to be generated.

In this specification, values described as random values also encompass values that are generated pseudorandomly by a deterministic procedure from a particular seed starting point. However, for brevity, these values will simply be referred to as random values. The number generator 260 can increase the randomness of the random values 245 by using an unpredictable seed. For example, the number generator can use the new data point 215 or a value generated from the new data point 215 as a seed to generate the random values 245 pseudorandomly.

The clustering engine 250 can then store the cluster assignment 235 for the new data point in a collection of cluster information 270. The collection of cluster information 270 can maintain an identifier for each data point and a cluster assignment for each data point. When performing online clustering, the clustering system 230 may store only recent cluster assignments 235, e.g., cluster assignments generated for data objects 205 received over the past hour, day, week, month, or year.

The cluster assignments 235 can be used by various consumers in a wide variety of applications, one of which is email spam filtering. For example, when the new data points represent email messages, after generating the cluster assignments 235, an email system can determine that the data points assigned to one of the clusters represent spam email messages. The email system can then filter the email messages represented by the data points assigned to the cluster of spam email messages in an appropriate manner, e.g., by deleting the email messages or delivering them to a spam email folder of an email application.

The clustering techniques described below can also be used by consumers for applications in other fields. For example, the data points can represent submissions by users in a social network, and the cluster assignments can represent trending topics in the user submissions. A social networking system can then present information about the trending topics to users of the social networking system. The data points can also represent online activity, and the cluster assignments can represent coordinated mass online activity indicative of fraud, e.g., fraudulent online reviews, fraudulent clicks, denial of service attacks, or other illegal online activity. The system can use the clustering assignments to take an appropriate action for the online activity represented by the data points of the cluster, e.g., by disregarding or discarding such online activity.

Figure 3:
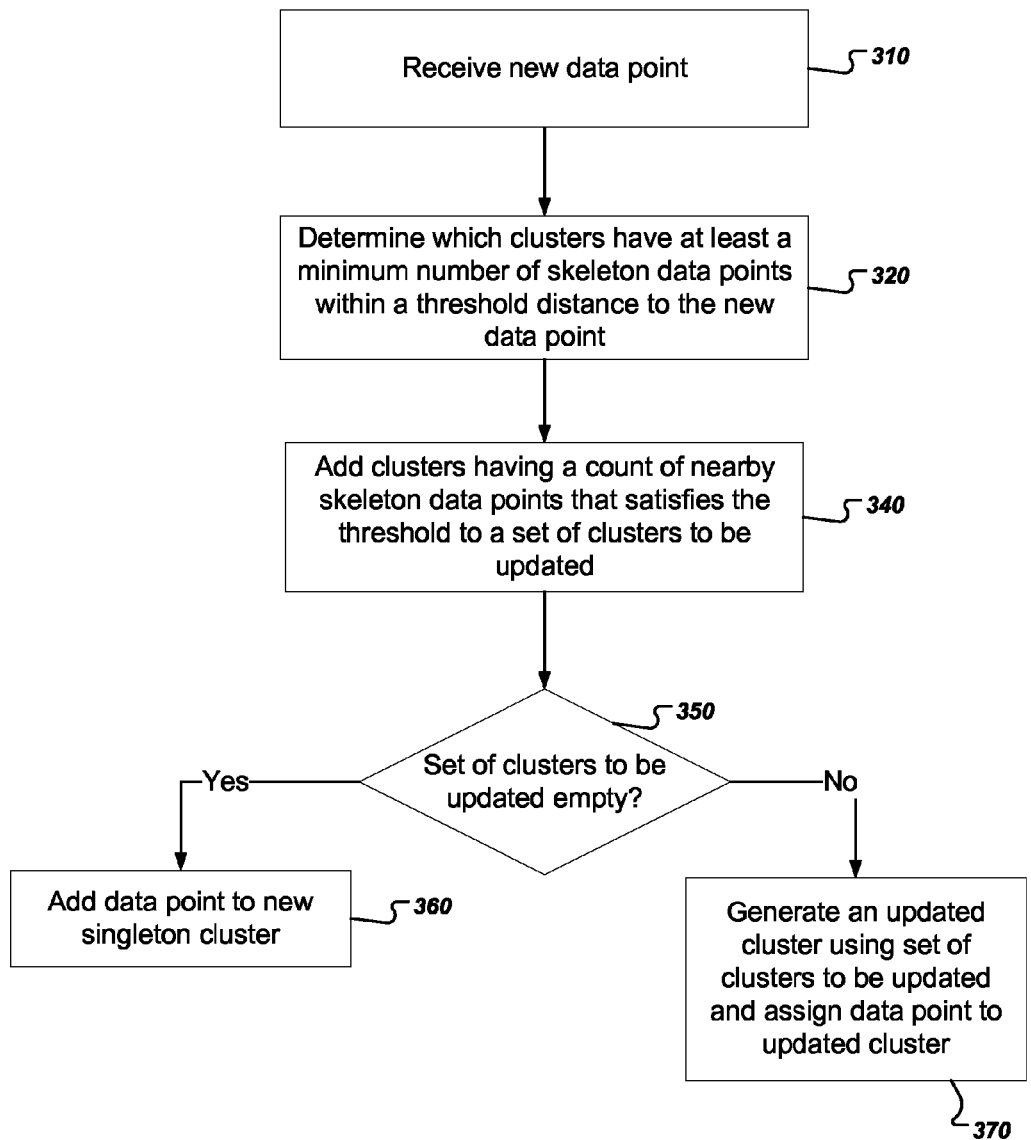
FIG. 3 is a flowchart of an example process for assigning a new data point to a cluster.

FIG. 3 is a flowchart of an example process for assigning a new data point to a cluster. In general, the system will assign the new data point to a cluster, which may be an existing cluster with existing skeleton data points, a merged cluster of one or more existing clusters with merged skeleton data points, or a singleton cluster having only the new data point. The process can be implemented by one or more computer programs installed on one or more computers. The process will be described as being performed by an appropriately programmed system of one or more computers, e.g., the clustering system 230 of FIG. 1.

The system receives a new data point (310). The new data point is a representation of a data object received by the system. For example, the data point can be a feature vector.

The new data point may be received in an online or real-time fashion. In other words, the system may not subject the data point substantial preprocessing operations and may assign the new data point to a cluster as the data point arrives without considering other data points that are arriving at about the same time.

The system determines which clusters have at least a minimum number of skeleton data points that are within a threshold distance of the new data point (320). In general, the system determines a distance between the new data point and each skeleton data point maintained for each cluster. The system can determine the distances according to any appropriate distance function, e.g., the $L_1$ distance or the $L_2$ (Euclidean) distance. The system then determines for each cluster how many skeleton data points are within a threshold distance to the new data point.

The threshold distance need not be the same for each cluster. Rather, the threshold can be a function of the number of skeleton data points for a particular cluster. Thus, clusters having a smaller number of skeleton data points may have a smaller threshold. In some implementations, the system defines the threshold to be $\alpha \times h$, where h is the number of skeleton data points in a cluster and $\alpha$ is a constant that represents a fraction of the number of data points in the cluster, e.g., 0.1, 0.2, or 0.5.

Figure 4A:
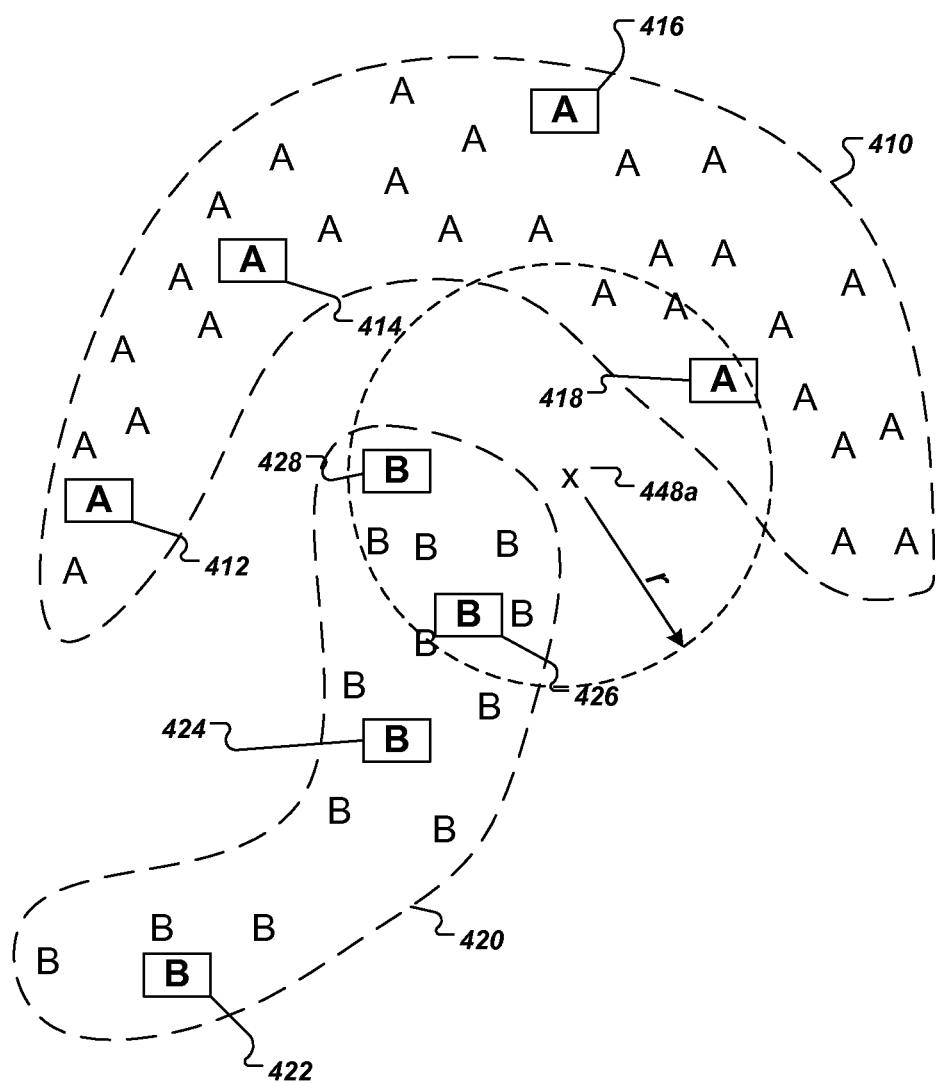
FIGS. 4A-C illustrate distances between a new data point and skeleton data points.
Figure 4B:
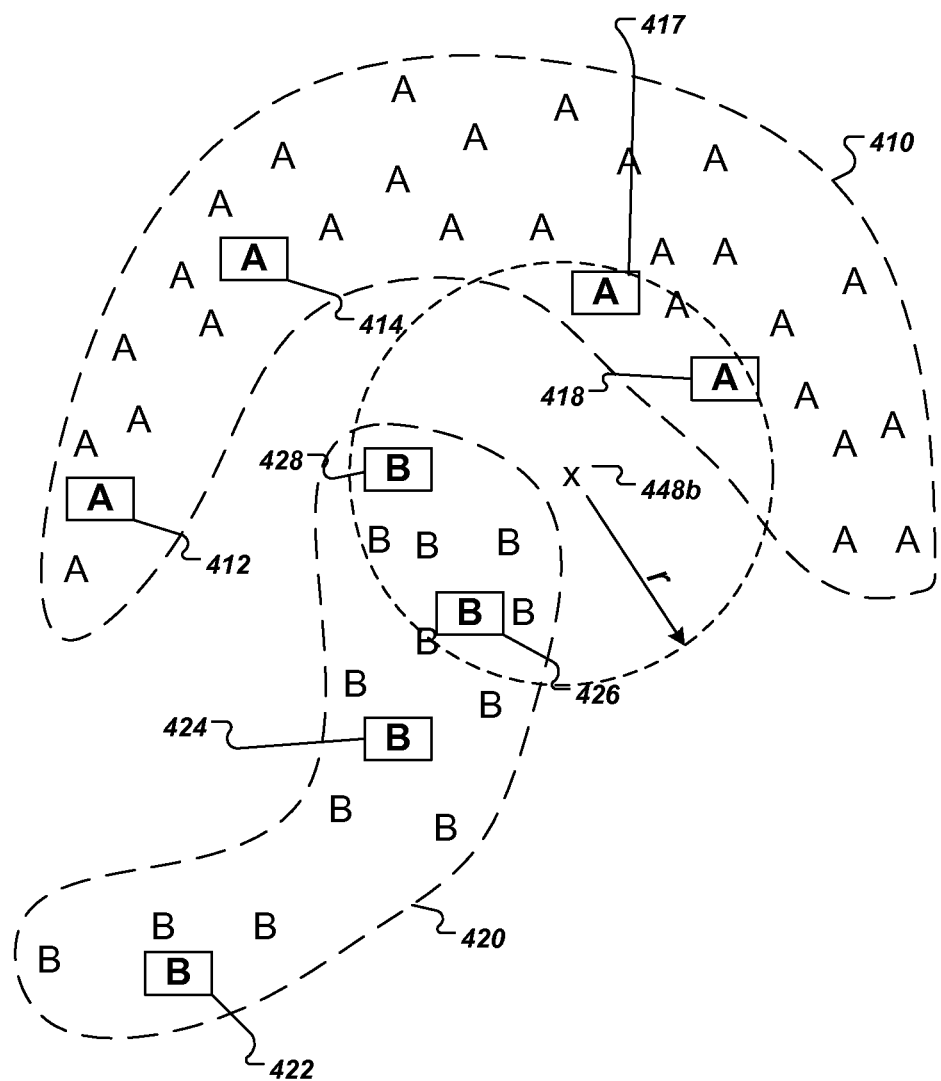
Figure 4C:
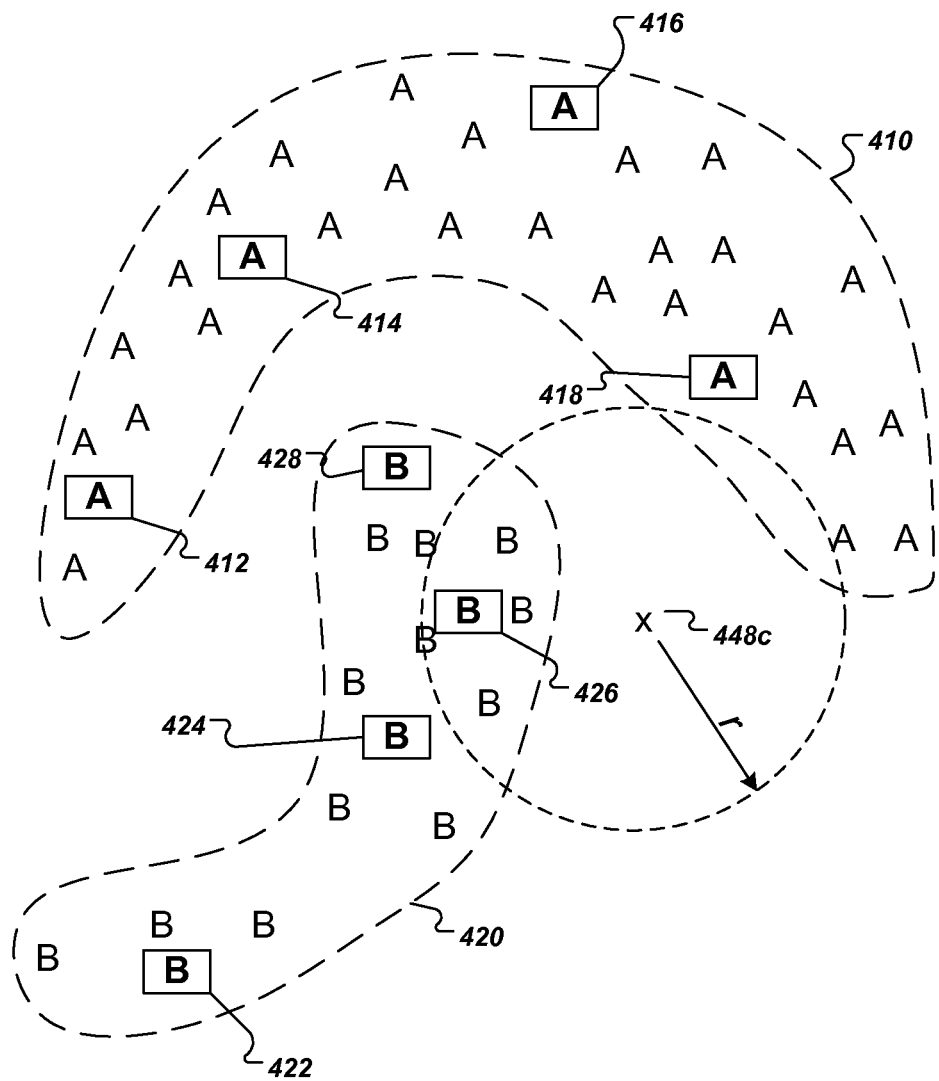

FIGS. 4A-C illustrate distances between a new data point and skeleton data points. As shown in FIG. 4A, a new data point x 448 is near a first cluster 410 and a second cluster 420. The first cluster 410 has its skeleton points 412, 414, 416, 418, and the second cluster 420 has its skeleton points 422, 424, 426, 428.

A distance function defines a radius r around the new data point x 448a. There are three nearby skeleton data points, i.e., skeleton data points that are within the radius r to the new data point x 448a: one skeleton point 418 in the first cluster 410, and two skeleton points 426 and 428 in the second cluster 420.

If the threshold for skeleton data points is two, the second cluster 420 would have a count of nearby skeleton data points that satisfied the threshold and the first cluster 410 would not.

As shown in FIG. 4B, if the first cluster 410 instead has the data point 417 as a skeleton data point, both the first cluster 410 and the second cluster 420 would have a count of nearby skeleton data points that satisfied the threshold for the new data point x 448b.

As shown in FIG. 4C, if the new data point x 448c is slightly farther away, only the skeleton data point 426 is a nearby skeleton data point. Thus, neither cluster would have a count of nearby skeleton data points that satisfied the threshold of two.

As shown in FIG. 3, the system adds each cluster having a count of nearby skeleton data points that satisfies the threshold to a set of clusters to be updated (340). Updating a cluster will be described in more detail below with reference to FIG. 5.

The system determines whether the set of clusters to be updated is empty (350). If so, the system adds the new data point to a new singleton cluster (branch to 360). Generating a new singleton cluster will be described in more detail below with reference to FIG. 6.

If the set of clusters to be updated is not empty, the system generates an updated cluster and assigns the data point to the updated cluster (branch to 370).

Figure 5:
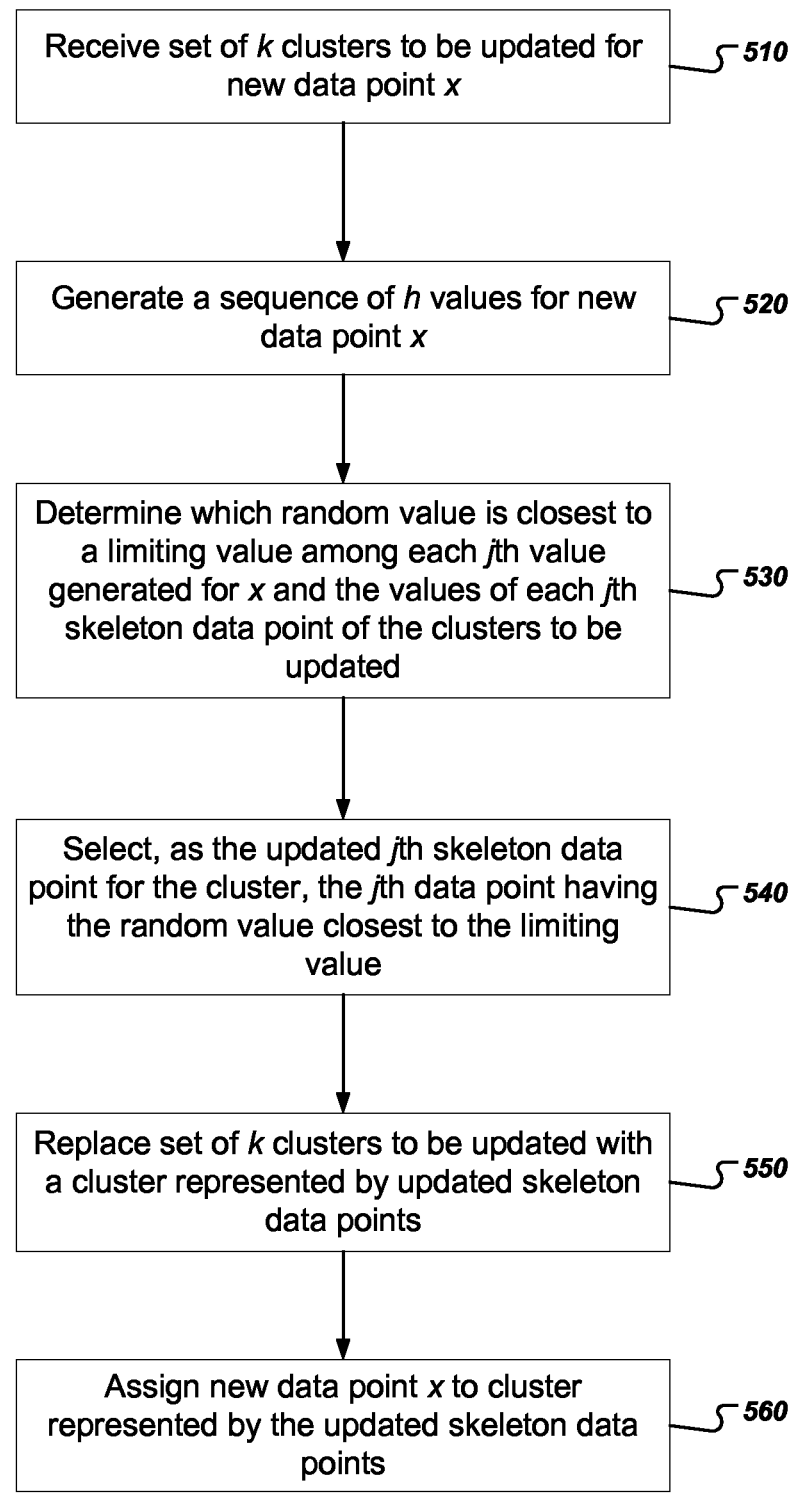
FIG. 5 is a flow chart of an example process for updating one or more clusters.

FIG. 5 is a flow chart of an example process for updating one or more clusters. The process will be described as being performed by an appropriately programmed system of one or more computers, e.g., the clustering system 230 of FIG. 1.

The system receives a set of k clusters to be updated for the new data point x (510). If k=1, the system will add the new data point x to the single cluster to be updated. If k>1, the system creates a newly merged cluster and adds the data point x to the newly merged cluster. The value of k, the number of clusters to be merged into a single cluster, may be any value up to the number of existing clusters. For example, the system may merge, 2, 10, or 100 clusters.

Each cluster is represented by an ordered tuple of h skeleton data points that are members of the cluster. Each skeleton data point is also associated with a random value previously generated when the skeleton data point was assigned to a position in the tuple representing the cluster.

For example, a first cluster may have the following tuple of skeleton data points: $((p_{1-1}, v_{1-1}), (p_{1-2}, v_{1-2}), (p_{1-3}, v_{1-3}), (p_{1-4}, v_{1-4}))$. The identifiers $p_{1-1}$, $p_{1-2}$, $p_{1-3}$, and $p_{1-4}$, in general, $p_{k-j}$, each identify a jth skeleton data point for the cluster k=1. The random values $v_{1-1}$, $v_{1-2}$, $v_{1-3}$, and $v_{1-4}$ are the corresponding random values associated with the respective skeleton data points.

The system generates a tuple of h random values for the new data point x (520). The system can use the number generator 260 to generate h random values from a uniform distribution of numbers, e.g., a distribution having values between 0 and 1. Thus, the system can generate the following tuple of random values for x: $(v_{x-1}, v_{x-2}, v_{x-3}, v_{x-4})$.

The system can avoid generating correlated random sequences by generating an initial seed for a pseudorandom procedure using the new data point x. In some implementations, the system partitions the feature space of the data points into a predetermined number of cells. The system determines an identifier of the cell to which the new data point belongs and uses the identifier of the cell as a seed for the pseudorandom procedure.

The system determines which random value is closest to a limiting value among each jth random value generated for x and the random values of each jth skeleton data point of the clusters to be updated (530), i.e., the k clusters in the set. The system performs an (k+1)-wise comparison of random values $v_{k-j}$ of the existing skeleton data points $p_{k-j}$ and each of the newly generated random values $v_{x-j}$ for x.

The index j indicates a position in the tuple of skeleton data points for each of the one or more clusters being updated and a corresponding position in the tuple of random values for x. The relative positions of the skeleton data points may, but need not, remain the same over successive iterations. In other words, a first skeleton data point updated during one update may be a third or fourth skeleton data point in a subsequent update.

If only one cluster is to be updated for the new data point x, the system can determine which of the random values is closest to the limiting value by performing a pair-wise comparison between the random values of the skeleton data points and the random values for x. In other words, where <=> represents comparison, the system compares the random values as follows:

$v_{1-1}$ <=> $v_{x-1}$,
$v_{1-2}$ <=> $v_{x-2}$,
$v_{1-3}$ <=> $v_{x-3}$,
$v_{1-4}$ <=> $v_{x-4}$,

The system can determine the random value that is closest to a limiting value in a variety of ways. Generally, as the system determines subsequent random values, the random values tend toward the limiting value.

For example, the system can select the minimum of the random values. If the random values belong to a uniform distribution between 0 and 1, not including 0, the system repeatedly selecting the minimum of the values causes the random values to tend toward the limiting value 0. Alternatively, the system can select the random value by selecting the maximum of the values, in which case the values will tend toward the limiting value 1, if the distribution does not include 1.

The system then selects, as the updated jth skeleton data point for the cluster, the data point having the random value closest to the limiting value (540). In general, the system selects either an existing skeleton data point or the new data point x.

For example, the system may select, for cluster to be updated, the following tuple of skeleton data points and associated random values: $((p_{1-1}, v_{1-1}), (p_{1-2}, v_{1-2}), (x, v_{1-3}), (p_{1-4}, v_{1-4}))$. In other words, the new data point x and its associated random value was selected to replace the third skeleton data point for the cluster. Depending on the tuple of random values generated for x, x may occur more than once in the tuple of skeleton data points.

When multiple clusters are being updated for the new data point x, the (k+1)-wise comparison results in the multiple clusters being merged into a single updated cluster. For example, assume that a second cluster k=2 is also being updated because at least a threshold number of its skeleton data points were nearby the new data point x. The second cluster has the following tuple of skeleton data points and associated random values: $((p_{2-1}, v_{2-1}), (p_{2-2}, v_{2-2}), (p_{2-3}, v_{2-3}), (p_{2-4}, v_{2-4}))$.

The system will then perform a three-way comparison between the jth random value of x and the jth random values of the k tuples of the k sets to determine a random value closets to the limiting value. If using minimum values, the system can thus determine the random values closest to the limiting value according to:

$\min(v_{1-1}, v_{2-1}, v_{x-1})$,
$\min(v_{1-2}, v_{2-2}, v_{x-2})$,
$\min(v_{1-3}, v_{2-3}, v_{x-3})$,
$\min(v_{1-4}, v_{2-4}, v_{x-4})$, where the operator min(a, b, c) returns the minimum value among its arguments a, b, and c.

If the clusters to be merged have differing numbers of skeleton data points, the system can perform the comparison between skeleton data points that are available and x. For example, if the second cluster k=2 had only three skeleton data points, the system can determine the random values according to:

$\min(v_{1-1}, v_{2-1}, v_{x-1})$,
$\min(v_{1-2}, v_{2-2}, v_{x-2})$,
$\min(v_{1-3}, v_{2-3}, v_{x-3})$, $\min(v_{1-4}, v_{x-4})$.

In the last min comparison, the system compared only the 4$^{th}$ random value for the first cluster and the 4th random value for x.

The system can also increase the number of skeleton data points for a cluster by selecting the new data point x and an associated random value for x as each added skeleton data point. For example, to increase the number of skeleton data points to five instead of four, the system can select, as the 5th skeleton data point, x and the 5th random value for x, or (x, $v_{x-5}$).

The system can also decrease the number of skeleton data points for a cluster by dropping skeleton data points in the tuple of skeleton data points. For example, to decrease the number of skeleton data points to three instead of four, the system can drop a particular jth skeleton data point from each cluster. The system may thus drop the 2nd skeleton data point and perform only the following comparisons to reduce the number of skeleton data points to three:

$\min(v_{1-1}, v_{2-1}, v_{x-1})$,
$\min(v_{1-3}, v_{2-3}, v_{x-3})$,
$\min(v_{1-4}, v_{2-4}, v_{x-4})$.

The system then selects for each tuple position the skeleton data point corresponding to the determined minimum random value. The result can be, for example, the following tuple of skeleton data points and associated random values for a new merged cluster: (($p_{2-1}$, $v_{2-1}$), ($p_{1-2}$, $v_{1-2}$), (x, $v_{x-3}$), ($p_{1-4}$, $v_{1-4}$)). In other words, the new data point x was selected to be the third skeleton data point of the merged cluster, and the first skeleton data point of the second cluster was selected to be the first skeleton data point of the merged cluster.

The system replaces the set of k clusters to be updated with an updated cluster represented by the updated skeleton data points (550). If only one cluster was to be updated, the system can simply update the skeleton data points for the cluster.

If multiple clusters were to be updated, the system can remove those clusters from the set of clusters and replace them with a single merged cluster that is represented by the updated skeleton data points. Or the system can remove all but one of the clusters and use the remaining cluster as the merged cluster.

To effectuate the merge, the system also reassigns all members of the merged clusters to the updated cluster. If reusing one of the merged clusters, the system can reassign all members of the removed clusters to the reused cluster.

The system assigns the new data point x to the updated cluster represented by the updated skeleton data points (560). The new data point x thus joins the updated cluster as a regular member or as a skeleton data point of the updated cluster.

The system can process new data points received in an online fashion, e.g., by considering each new data point once. In other words, the system only determines random values for the new data point once and also only determines intersecting clusters for the new data point once.

Figure 4D:
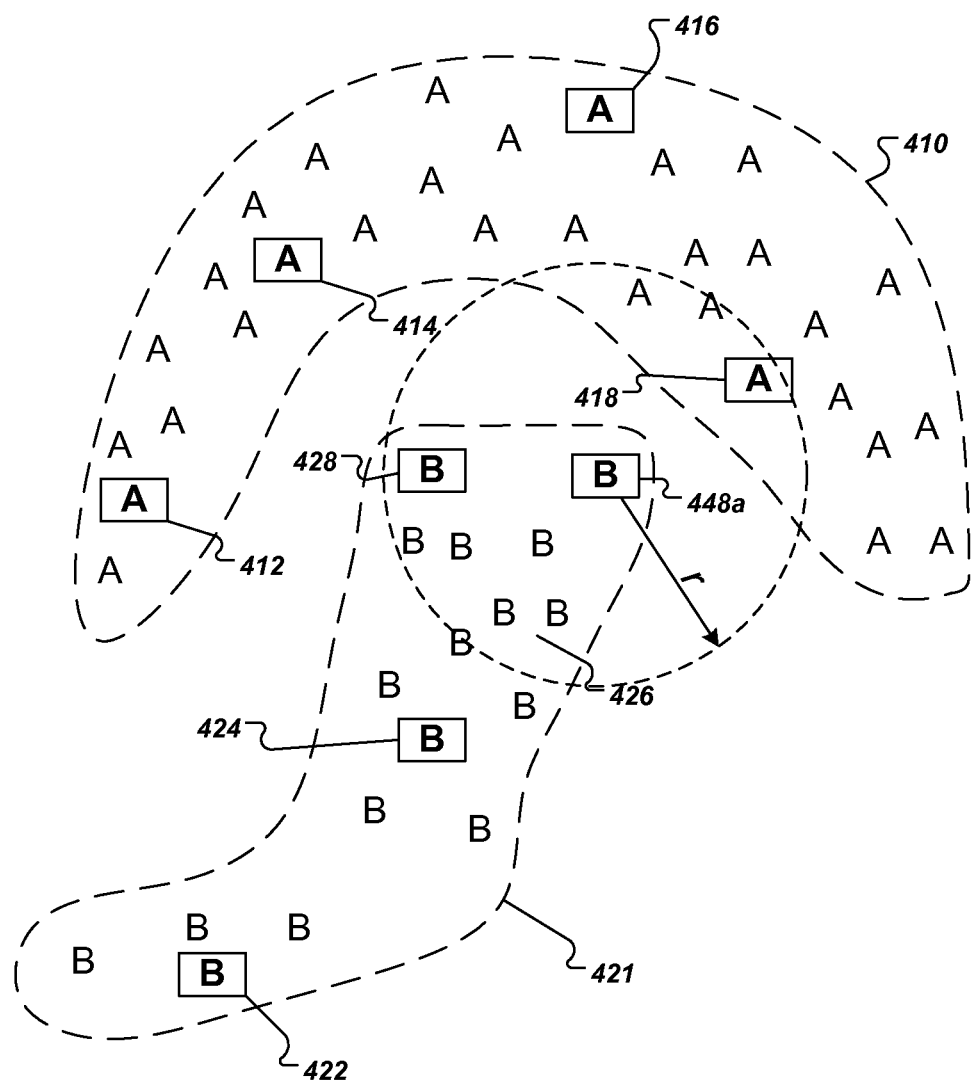
FIG. 4D illustrates an example assignment of the new data point for the example illustrated in FIG. 4A.

FIG. 4D illustrates an example assignment of the new data point 448*a* for the example illustrated in FIG. 4A. The system has added the new data point 448*a* to the second cluster 421 and has also selected the new data point 448*a* to be an updated skeleton data point, replacing the previous skeleton data point 426.

Figure 4E:
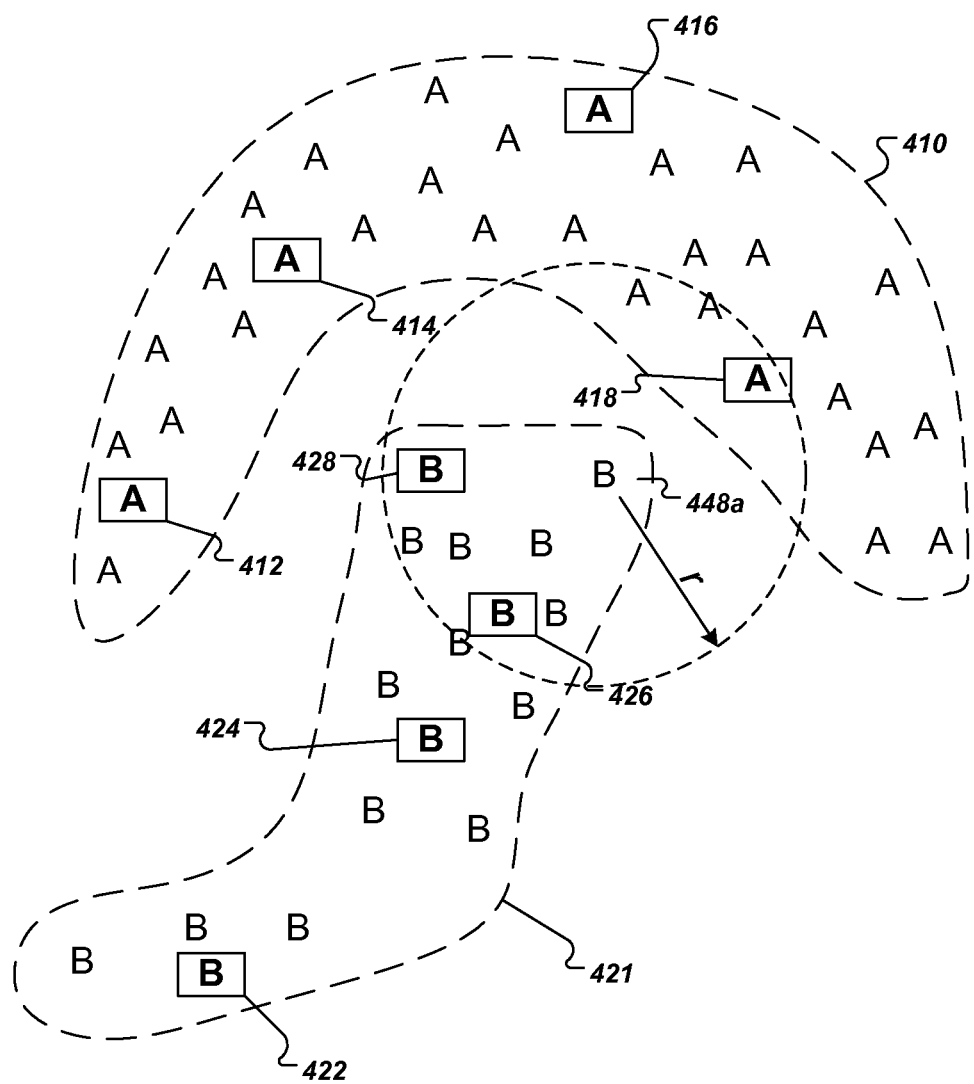
FIG. 4E illustrates another example assignment of the new data point for the example illustrated in FIG. 4A.

FIG. 4E illustrates another example assignment of the new data point 448*a* for the example illustrated in FIG. 4A. The system has also added the new data point 448*a* to the second cluster 421, but the system did not select the new data point 448*a* as a new skeleton data point for the cluster.

Figure 4F:
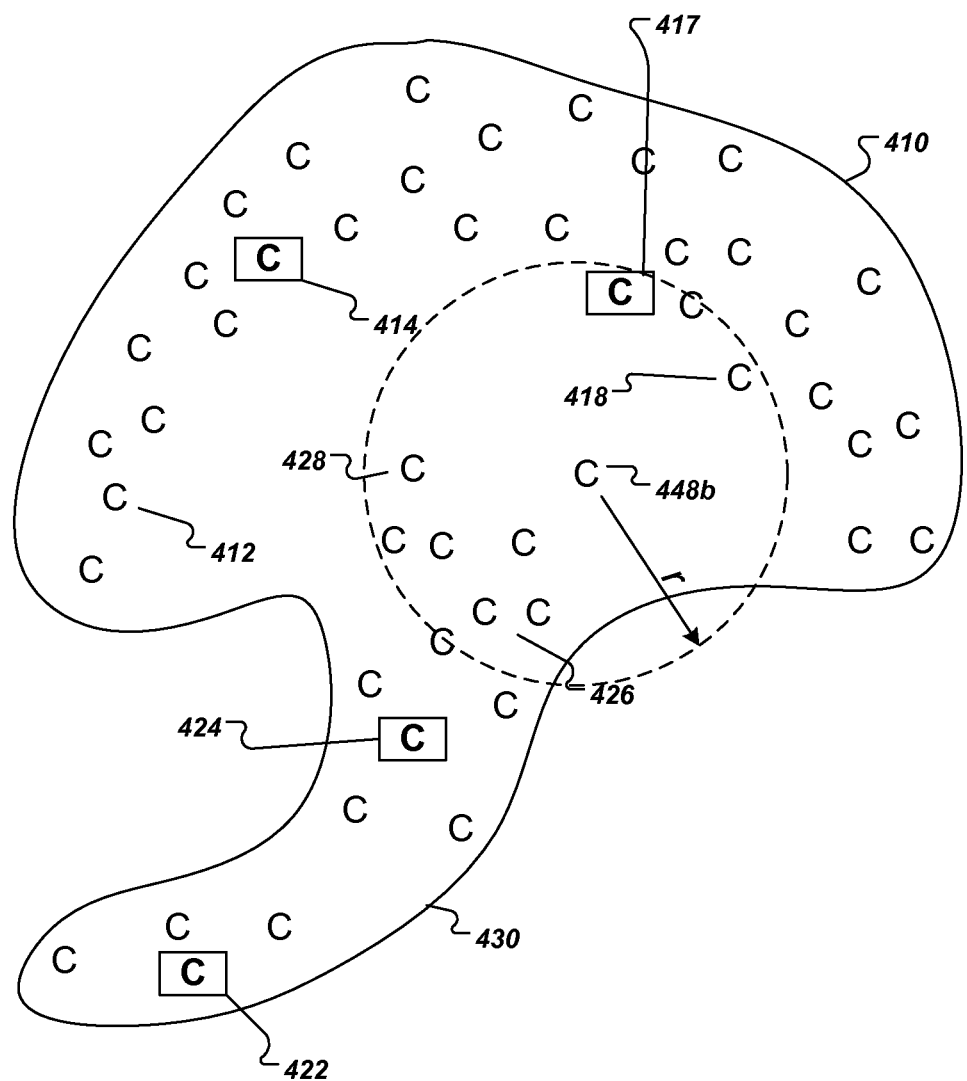
FIG. 4F illustrates an example assignment and merged clusters for the new data point for the example illustrated in FIG. 4B.

FIG. 4F illustrates an example assignment and merged clusters for the new data point 448*b* for the example illustrated in FIG. 4B. The system has merged the clusters and formed a new cluster 430. The new data point 448*b* is assigned to the newly merged cluster 430, which is represented by four selected skeleton data points 422, 424, 414, and 417.

Figure 6:
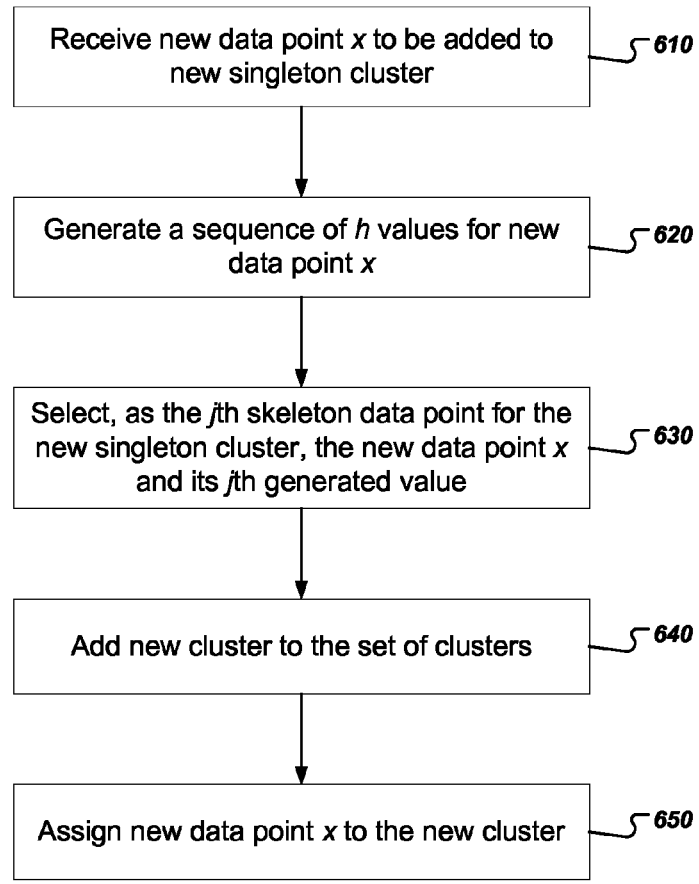
FIG. 6 is a flow chart of an example process for adding a new singleton cluster.

FIG. 6 is a flow chart of an example process for adding a new singleton cluster. In general, the system generates a new cluster having a tuple of skeleton data points in which the new data point x is selected for each position, along with h different random values. The process will be described as being performed by an appropriately programmed system of one or more computers, e.g. the clustering system 230 of FIG. 1.

The system receives a new data point x to be added to a new singleton cluster (610). Although the new cluster will have a single member, the new cluster will still have a tuple of h skeleton data points.

The system generates a tuple of h random values for the new data point x (620). As described above with reference to FIG. 5, the system can generate random or pseudorandom values that have properties of a particular probability distribution, possibly using the new data point x to generate a seed value. Thus, the system can generate the following tuple of random values for x: ($v_{x-1}$, $v_{x-2}$, $v_{x-3}$, $v_{x-4}$).

The system selects, for each jth skeleton data point for the new singleton cluster, the new data point x and its jth generated random value (630). Thus, the new data point x occurs at each position of the tuple of skeleton data points for the new cluster. However, each instance of x as a skeleton data point has a different associated random value. For example, the tuple of skeleton data points and random values for the cluster can be: ((x, $v_{x-1}$), (x, $v_{x-2}$), (x, $v_{x-3}$), (x, $v_{x-4}$)).

The system adds the new cluster to the set of clusters (640). The system thus increases the number of clusters in the set of clusters by one. The system then assigns the new data point x to the new cluster (650).

Figure 4G:
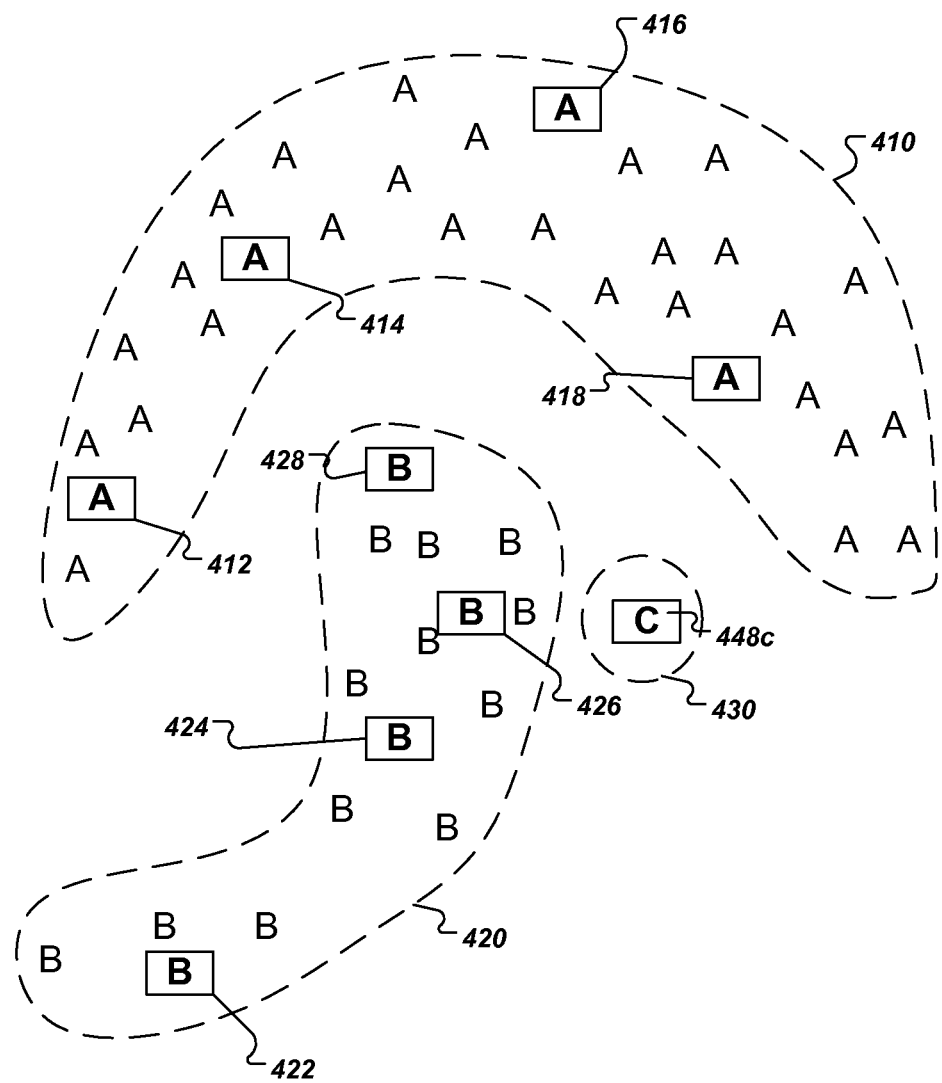
FIG. 4G illustrates an examples assignment of the new data point for the example illustrated in FIG. 4C.

FIG. 4G illustrates an examples assignment of the new data point 448*c* for the example illustrated in FIG. 4C. The system has generated a new cluster 430 having a single member, the new data point 448*c*. The new data point 448*c* is also the single, skeleton data point for the new cluster 430.

In the foregoing description, clustering can be performed without removing or disregarding any received data points. However, in some online applications, "forgetting" some data points after a certain period of time may be beneficial. For example, a system can be configured to forget data points older than one day, one week, or one month.

In such instances, if a skeleton data point were to be forgotten, the system could replace the forgotten skeleton data point with the next new data point x or with another instance of an existing skeleton data point.

The system can also implement forgetting by associating each skeleton data point with a weight that decays over time. When the weight drops below a particular value, the system can forget the skeleton data point.

Then, for each new data point, the system can consider the weights of nearby skeleton data points when determining whether a minimum number of skeleton data points are within the threshold distance to the new data point, as described above with reference to FIG. 3. For example, the system can compute a weighted sum of skeleton data points within the threshold distance rather than a simple count of skeleton data points within the threshold distance.

In some cases, a system may split a cluster after forgetting a skeleton data point that effectively links multiple portions of a cluster. The system can identify such forgotten "linking" skeleton data points in a number of ways. For example, when a skeleton data point for a cluster is forgotten, the system can analyze distances between the remaining skeleton data points for the cluster as a neighborhood graph. The system can then determine whether the neighborhood graph includes multiple connected components according to the distances.

If so, the system can split the cluster into multiple clusters corresponding to each of the connected components. Each split cluster will then inherit a subset of the previous set of skeleton data points. The system can then replace the remaining skeleton data points in the split clusters with the new data point x or with another instance of an existing skeleton data point inherited by the split cluster. Alternatively, when then number of skeleton data points can differ between clusters, the system may not fill in the missing skeleton data points with new skeleton data points.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of assigning a new data point to a cluster, the method comprising:
   maintaining a respective ordered tuple of skeleton points for each of one or more clusters of data points, each skeleton point of each respective tuple being one of the data points of the corresponding cluster, wherein each cluster has more total data points than skeleton points, wherein each tuple has M or more skeleton points, where M is greater than three, and wherein each skeleton point at each position in each cluster has a respective associated random value;
   receiving the new data point;
   identifying two or more intersecting clusters for the new data point, each intersecting cluster being a cluster having at least a threshold number of skeleton points that are within a threshold distance of the new data point;
   generating, for the new data point, an ordered tuple of M random values;
   generating a new cluster to replace the two or more intersecting clusters, including:
      generating a new ordered tuple of M skeleton points for the new cluster, including selecting as the skeleton point in the j-th position in the new tuple, for $1 \leq j \leq M$, either (i) the new data point or (ii) a skeleton point in the j-th position of the tuple of one of the two or more intersecting clusters, including
      selecting the skeleton point associated with the closest random value to a limiting value among the random values associated with the j-th positions in the tuples if the closest random value is closer to the limiting value than the j-th random value of the new data point, or
      selecting the new data point otherwise; and
      associating as the random value of each skeleton point at each position in the new tuple either (i) the random value of the skeleton point selected for the position if a skeleton point was selected or (ii) the random value at the corresponding position in the tuple of random values of the new data point otherwise;
   replacing the two or more intersecting clusters with the new cluster, the new cluster having as data points all the data points of the two or more intersecting clusters; and
   assigning the new data point to the new cluster.

2. The method of claim 1, further comprising:
   receiving a second new data point;
   determining that none of the plurality of clusters have at least a threshold number of skeleton data points within a threshold distance of the second new data point;
   generating M new random values for the second new data point; and
   generating a new cluster represented by a tuple of new skeleton points, each new skeleton point being the second new data point and each new skeleton point being associated with a respective new random value for the respective position in the tuple of new skeleton points; and
   adding the new cluster to the plurality of clusters.

3. The method of claim 1, wherein generating M random values for the new data point comprises:
   partitioning a feature space of data points into a plurality of cells;

determining an identifier of a first cell of the plurality of cells to which the new data point belongs; and using the identifier as a seed value for a random number generation process.

4. A system comprising:

one or more computers and one or more non-transitory storage devices storing instructions that are operable, when executed by the one or more computers, to cause the one or more computers to perform operations comprising:

maintaining a respective ordered tuple of skeleton points for each of one or more clusters of data points, each skeleton point of each respective tuple being one of the data points of the corresponding cluster, wherein each cluster has more total data points than skeleton points, wherein each tuple has M or more skeleton points, where M is greater than three, and wherein each skeleton point at each position in each cluster has a respective associated random value;

receiving a new data point;

identifying two or more intersecting clusters for the new data point, each intersecting cluster being a cluster having at least a threshold number of skeleton points that are within a threshold distance of the new data point;

generating, for the new data point, an ordered tuple of M random values;

generating a new cluster to replace the two or more intersecting clusters, including:

generating a new ordered tuple of M skeleton points for the new cluster, including selecting as the skeleton point in the j-th position in the new tuple, for $1 \leq j \leq M$, either (i) the new data point or (ii) a skeleton point in the j-th position of the tuple of one of the two or more intersecting clusters, including selecting the skeleton point associated with the closest random value to a limiting value among the random values associated with the j-th positions in the tuples if the closest random value is closer to the limiting value than the j-th random value of the new data point, or selecting the new data point otherwise; and associating as the random value of each skeleton point at each position in the new tuple either (i) the random value of the skeleton point selected for the position if a skeleton point was selected or (ii) the random value at the corresponding position in the tuple of random values of the new data point otherwise;

replacing the two or more intersecting clusters with the new cluster, the new cluster having as data points all the data points of the two or more intersecting clusters; and assigning the new data point to the new cluster.

5. The system of claim 4, wherein the operations further comprise:

receiving a second new data point;

determining that none of the plurality of clusters have at least a threshold number of skeleton data points within a threshold distance of the second new data point;

generating M new random values for the second new data point; and generating a new cluster represented by a tuple of new skeleton points, each new skeleton point being the second new data point and each new skeleton point being associated with a respective new random value for the respective position in the tuple of new skeleton points; and adding the new cluster to the plurality of clusters.

6. The system of claim 4, wherein generating M random values for the new data point comprises:

partitioning a feature space of data points into a plurality of cells;

determining an identifier of a first cell of the plurality of cells to which the new data point belongs; and using the identifier as a seed value for a random number generation process.

7. One or more non-transitory computer-readable storage media encoded with instructions that, when executed by one or more computers, cause the one or more computers to perform operations comprising:

maintaining a respective ordered tuple of skeleton points for each of one or more clusters of data points, each skeleton point of each respective tuple being one of the data points of the corresponding cluster, wherein each cluster has more total data points than skeleton points, wherein each tuple has M or more skeleton points, where M is greater than three, and wherein each skeleton point at each position in each cluster has a respective associated random value;

receiving a new data point;

identifying two or more intersecting clusters for the new data point, each intersecting cluster being a cluster having at least a threshold number of skeleton points that are within a threshold distance of the new data point;

generating, for the new data point, an ordered tuple of M random values;

generating a new cluster to replace the two or more intersecting clusters, including:

generating a new ordered tuple of M skeleton points for the new cluster, including selecting as the skeleton point in the j-th position in the new tuple, for $1 \leq j \leq M$, either (i) the new data point or (ii) a skeleton point in the j-th position of the tuple of one of the two or more intersecting clusters, including selecting the skeleton point associated with the closest random value to a limiting value among the random values associated with the j-th positions in the tuples if the closest random value is closer to the limiting value than the j-th random value of the new data point, or selecting the new data point otherwise; and associating as the random value of each skeleton point at each position in the new tuple either (i) the random value of the skeleton point selected for the position if a skeleton point was selected or (ii) the random value at the corresponding position in the tuple of random values of the new data point otherwise;

replacing the two or more intersecting clusters with the new cluster, the new cluster having as data points all the data points of the two or more intersecting clusters; and assigning the new data point to the new cluster.

8. The one or more non-transitory computer-readable storage media of claim 7, wherein the operations further comprise:

receiving a second new data point;

determining that none of the plurality of clusters have at least a threshold number of skeleton data points within a threshold distance of the second new data point;

generating M new random values for the second new data point; and generating a new cluster represented by a tuple of new skeleton points, each new skeleton point being the second new data point and each new skeleton point being associated with a respective new random value for the respective position in the tuple of new skeleton points; and adding the new cluster to the plurality of clusters.

9. The one or more non-transitory computer-readable storage media of claim 7, wherein generating M random values for the new data point comprises:

partitioning a feature space of data points into a plurality of cells;

determining an identifier of a first cell of the plurality of cells to which the new data point belongs; and using the identifier as a seed value for a random number generation process.

* * * * *